(12) United States Patent
Ennes

(10) Patent No.: US 7,129,468 B2
(45) Date of Patent: Oct. 31, 2006

(54) ELECTRONIC ASSEMBLY FOR THE PRODUCTION OF WIRELESS STRING INSTRUMENTS

(75) Inventor: Gene Ottes Ennes, El Dorado, CA (US)

(73) Assignee: Gene Ennes, El Dorado, CA (US)

( * ) Notice: Subject to any disclaimer, the term of this patent is extended or adjusted under 35 U.S.C. 154(b) by 243 days.

(21) Appl. No.: 10/199,811

(22) Filed: Sep. 30, 2002

(65) Prior Publication Data

US 2003/0094567 A1  May 22, 2003

Related U.S. Application Data

(60) Provisional application No. 60/332,579, filed on Nov. 19, 2001.

(51) Int. Cl.
*G01H 3/33* (2006.01)
*H05B 1/034* (2006.01)

(52) U.S. Cl. .................. 250/221; 250/231.1; 84/723

(58) Field of Classification Search ............... 250/221, 250/222.1, 231; 84/723–726, 267, 290; 984/365, 984/368, DIG. 1
See application file for complete search history.

(56) References Cited

U.S. PATENT DOCUMENTS

| | | | | |
|---|---|---|---|---|
| 3,564,104 A | * | 2/1971 | Reynolds | 84/697 |
| 3,733,953 A | * | 5/1973 | Ferber | 84/724 |
| 3,887,937 A | * | 6/1975 | Gatos et al. | 257/417 |
| 4,186,641 A | * | 2/1980 | Dorfman | 84/723 |
| 4,270,226 A | * | 5/1981 | Weintraub et al. | 455/353 |
| 4,688,460 A | * | 8/1987 | McCoy | 84/724 |
| 4,815,353 A | * | 3/1989 | Christian | 84/724 |
| 5,025,704 A | * | 6/1991 | Davis | 84/723 |
| 6,800,800 B1 | * | 10/2004 | Giordano et al. | 84/726 |

* cited by examiner

*Primary Examiner*—Stephone B. Allen
(74) *Attorney, Agent, or Firm*—Gene Ennes

(57) ABSTRACT

An optoelectronic pickup that generates a fluctuating voltage that is analogous to the vibrations of a vibrating body. When utilized with the vibrating body of a musical instrument and amplified and fed to a speaker the musical tones are reproduced at an amplified level. When the signal is fed to an FM transmitter the musical tones can be reproduced in any FM radio receiver. The device makes possible portable electric instruments and 'wireless'-electrical instruments, i.e. a guitar that does not require a connecting cord or amplifier. The device anticipates new and unique musical instruments.

1 Claim, 6 Drawing Sheets

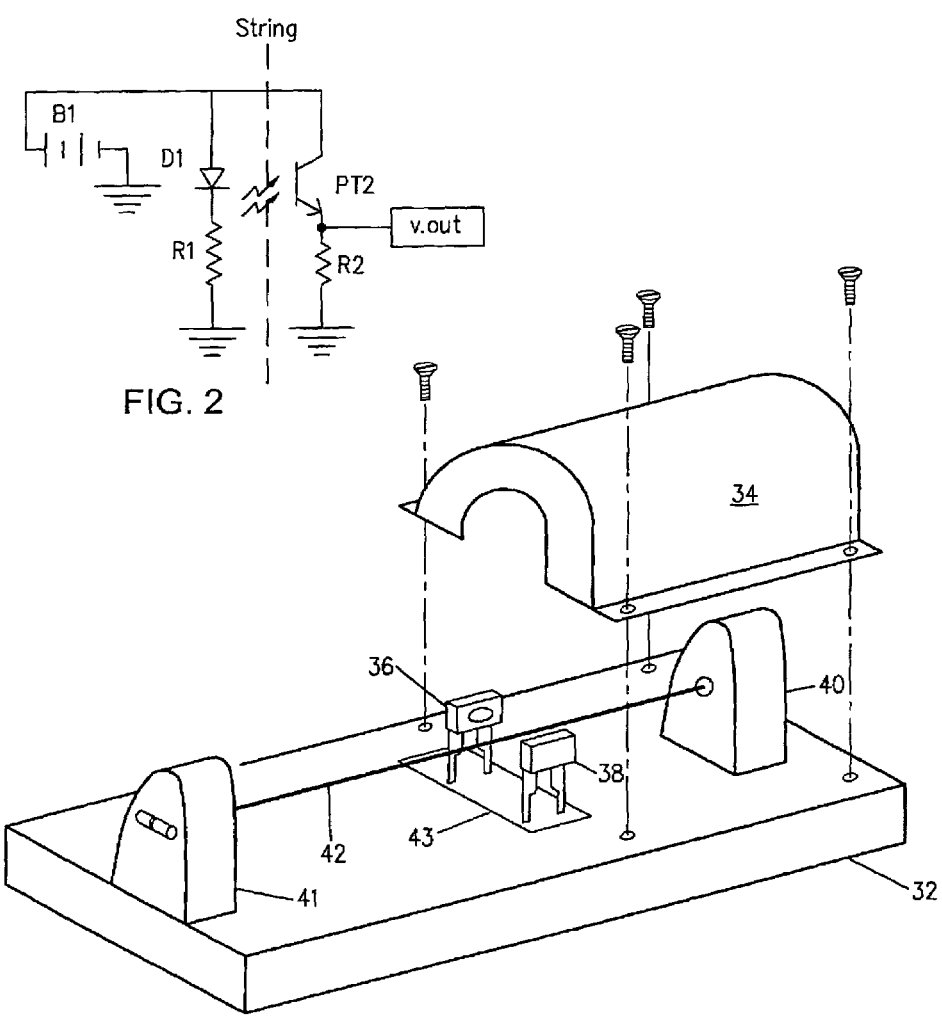

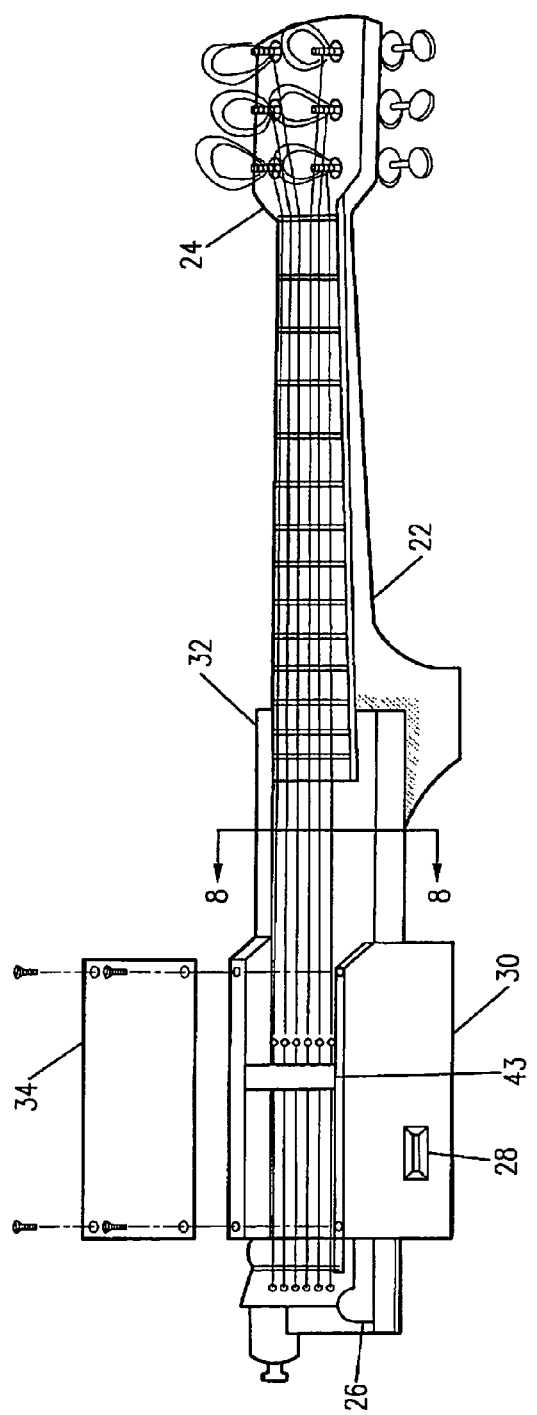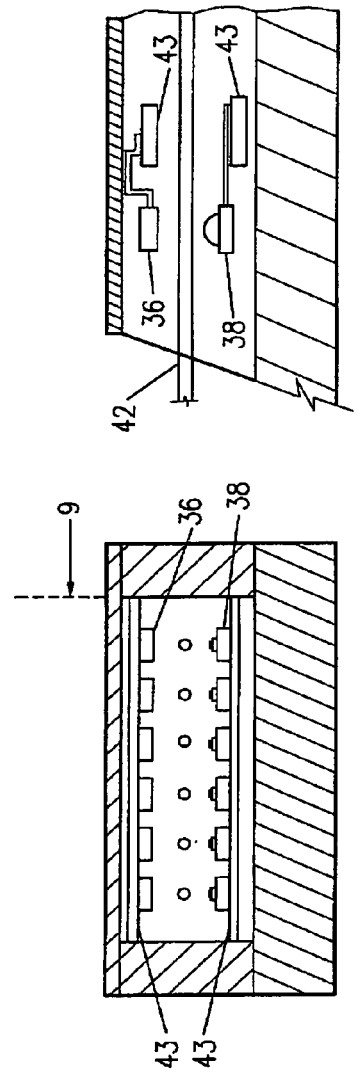

ELECTRONIC ASSEMBLY FOR THE PRODUCTION OF WIRELESS STRING INSTRUMENTS

This application claims the benefit of the filing date of provisional patent No. 60/332,579 filed on Nov. 19, 2001.

BACKGROUND OF THE INVENTION

The present invention relates to an optoelectric pickup unit that is responsive to that part of a musical instrument that vibrates when the instrument is played.

The standard magnetic pickup has a weak signal and can only be utilized with metal strings, is sensitive to stray fluctuating magnetic fields and has limited frequency response.

U.S. Pat. No. 3,733,953 issued to Mr. Ferber in 1973 discloses an optoelectric pickup that operates on the principal of a string intersecting the path of a light beam from a light-emitting device toward a light-detecting device. Mr. Ferbers' invention has some of the same advantages as the present invention but must still have a complicated sound box with an acoustic speaker, which makes for a large and heavy instrument that is technically difficult to manufacture.

U.S. Pat. No. 05,012,086 issued to Mr. Bernard in 1991 claims to overcome several of the disadvantages of previous optoelectrical pickups but is itself of such a highly technical nature as to be difficult to understand or reproduce.

Pizeo-electric transducer pickups have been devised that overcome some of the deficiencies of the magnetic pickup but these, like most others, require an electrical connection cord and a separate amplifying system.

OBJECTS OF THE INVENTION

It is an object of the present invention to provide a light-weight pickup that facilitates the production of portable electric musical instruments that have a self-contained amplifying unit.

It is another object of this invention to provide for the production of 'wireless' musical instruments, musical instruments that are as portable as their acoustic counterparts by utilizing a radio transmitter to broadcast their musical vibrations to any nearby radio receiver, eliminating the necessity for a connecting electrical cord and amplifier.

It is another object of the present invention to provide a simple pickup that is easily manufactured providing light-weight low cost electric musical instruments of good quality to the general public.

Reference Numerals in Drawing:
11. Dynamic speaker.
14. 12 V Battery.
16. Combination potentiometer/on/off switch.
18. Tensioning device.
20. Soundboard.
22. Guitar neck.
24. Guitar head.
26. Bridge.
28. Push button on/off switch.
30. Enclosure.
32. Soundboard.
34. Ambient light shield.
36. Photo detector.
38. Light emitting element.
40. String support.
41. String support.
42. String.
43. Printed circuit board.

A BRIEF DESCRIPTION OF THE DRAWINGS

FIG. 1 is a perspective view of a light emitting diode and a light-detector suitably mounted on a circuit board facing each other with a string suspended in between.

FIG. 2 is an electrical schematic showing the circuit used to pickup the vibrations of the string of FIG. 1.

Figures 3, 4:
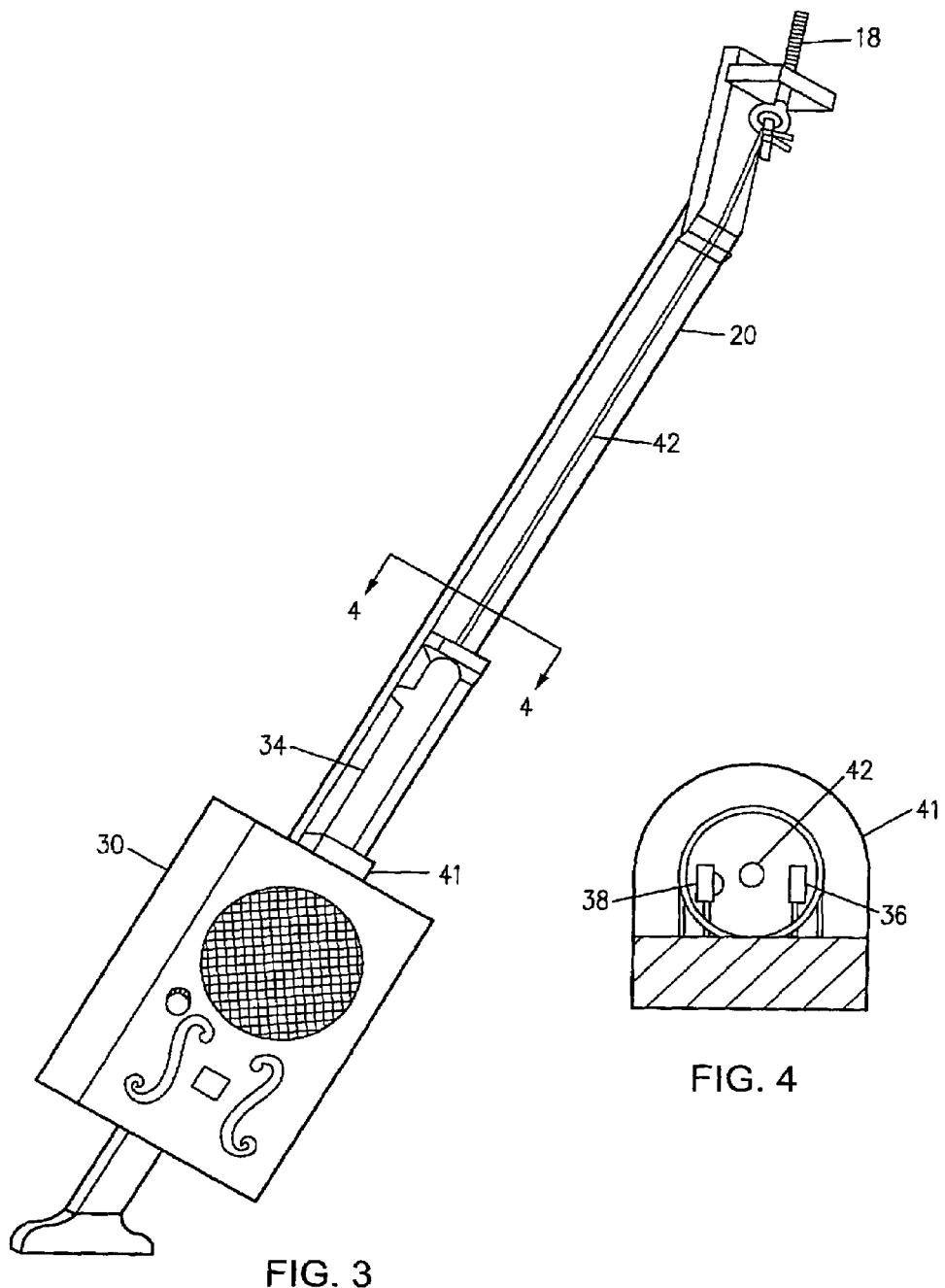
FIG. 3 is a perspective view of a practical embodiment of FIG. 1.
FIG. 4 is a view taken along line 4—4 of FIG. 3 illustrating an arrangement for photoelectrically sensing the vibrations of a string.
Figure 6:
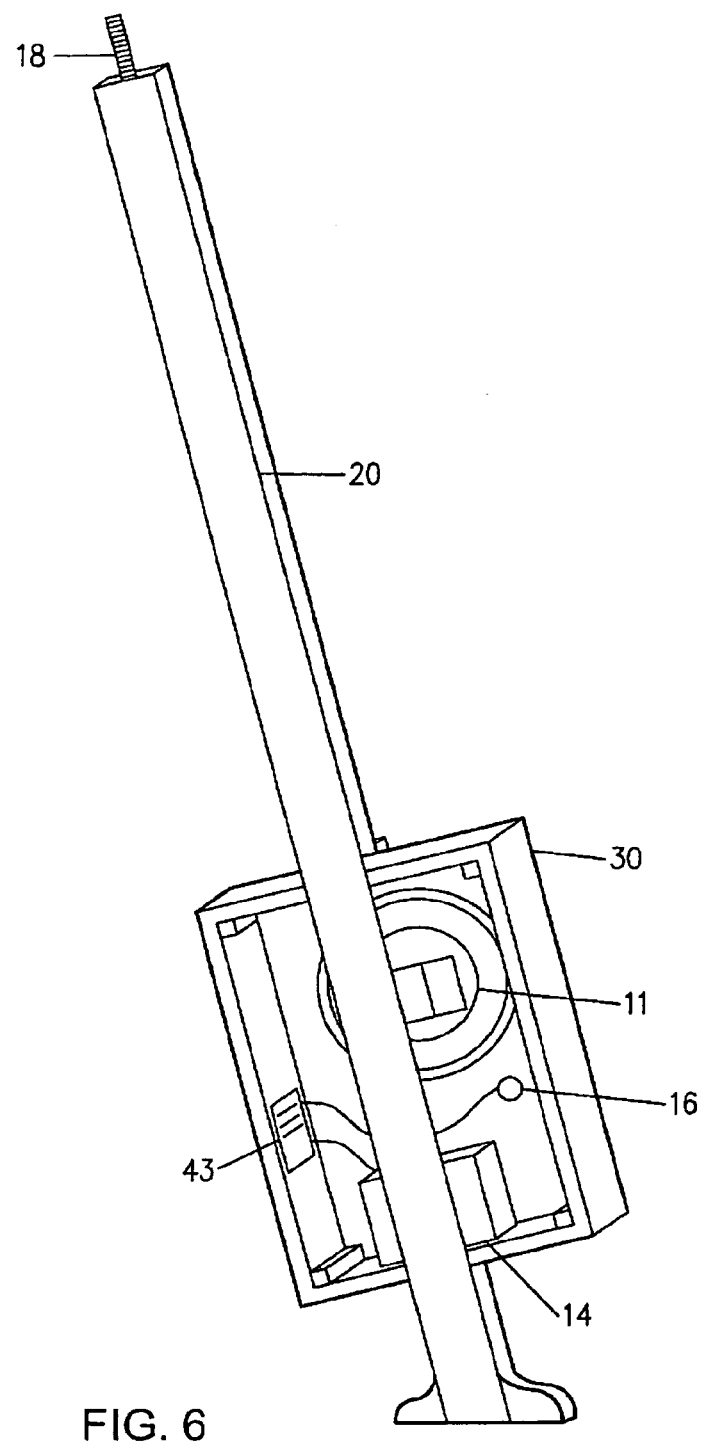

FIG. 6 is a rear view of FIG. 3 showing how the electrical components are situated inside the enclosure 30-dynamic speaker-10, electronic circuit board 43, battery 14, combination on/off switch volume-control 16.

FIG. 7 is a perspective view of a conventional guitar neck and head mounted on a soundboard and enclosure that contains 6 pairs of the optoelectric pickups shown in FIG. 1 and an FM radio transmitter with a 9 V battery (not shown).

FIG. 8 is a view taken along line 8—8 of FIG. 7 showing an arrangement of sensing the vibrations of the guitar strings to provide electronic signals that are fed to an FM transmitter which broadcasts a signal analogous to the strings vibrations to an FM radio receiver.

FIG. 9 is a view taken along line 9—9 of FIG. 8 showing a single guitar string in relation to a light source and a light sensitive detector.

Figure 10:
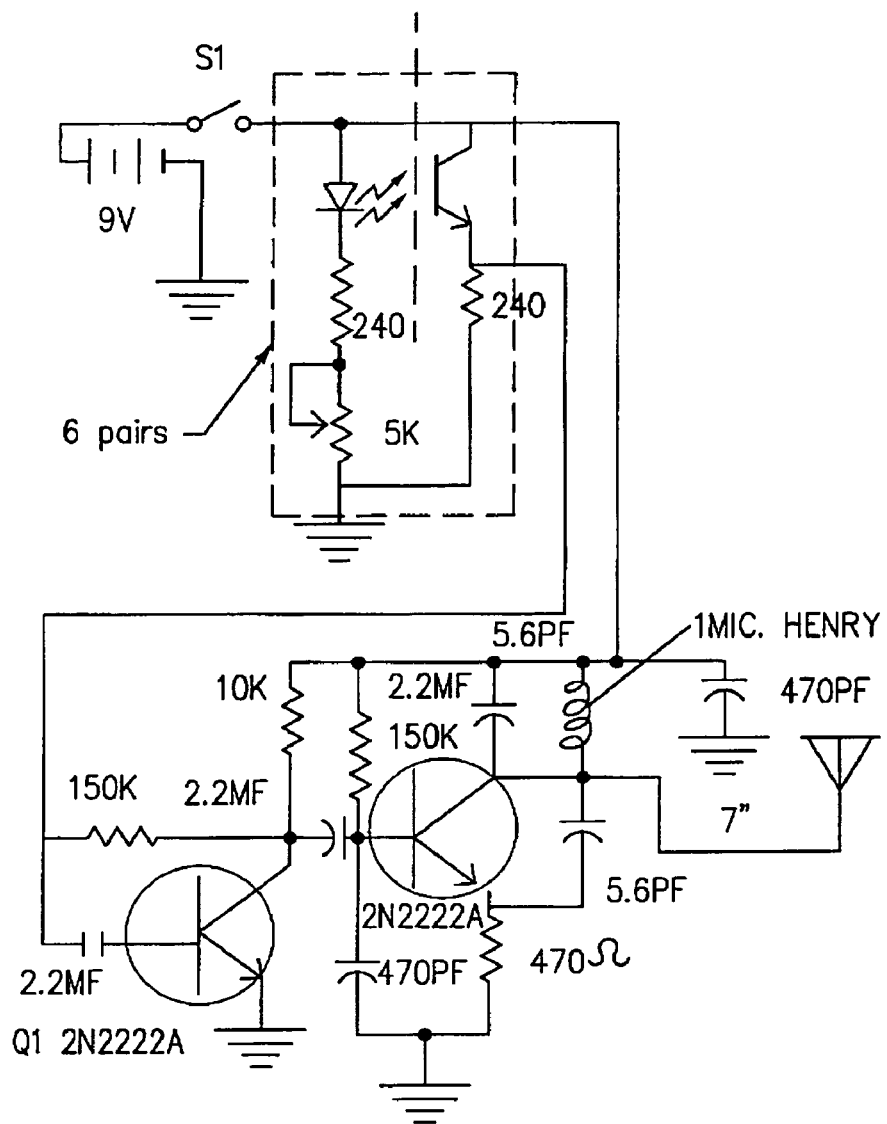

FIG. 10 is an electrical schematic of a 'wireless guitar' showing the circuitry of the vibration sensing elements connected to a radio transmitter.

DESCRIPTION OF A SIMPLE EMBODIMENT

FIG. 1 shows a perspective view of a soundboard 32 from which an ambient light shield 34 is removably attached by means of screws. String supports 40 and 41 have a string 42 tensioned in between. A light-emitting source 38 is soldered to a printed circuit board 43 facing a light-detecting element 36, which is also soldered to the printed circuit board 43. The string 42 is mounted so that the light from 38 is interfered with before it impinges on light detecting element 36. When 36 and 38 are suitably biased by a battery (not shown) and the string 42 is set into motion, the light impinging on the photo-detector is interfered with causing a fluctuation in the current through the detector 36, and causing a fluctuating voltage at the junction of the detectors' emitter connection and resistor R2 of FIG. 2, that is analogous to the frequency of vibration of the string.

DESCRIPTION OF A PRACTICAL EMBODIMENT

FIG. 3 is a perspective view of a one string bass electric instrument showing a tubular ambient light shield 34 with a string 42 tensioned through it and attached inside the enclosure 30 to ambient light shield support 41 on one end and tied to an adjustable tensioning device 18 on the other end.

FIG. 4 is a view along lines 4—4 which shows the string 42, tensioned in between a light emitting source 38 and a light detector 36 in such a way as to interfere with the light from the source impinging on the light detector.

The basic musical tone of the string can be raised or lowered by the adjustable tensioning device 18.

The instrument is played by holding down the string 42 on the fingerboard 20 and plucking the string near the ambient light shield in a direction normal to the fingerboard.

Figure 5:
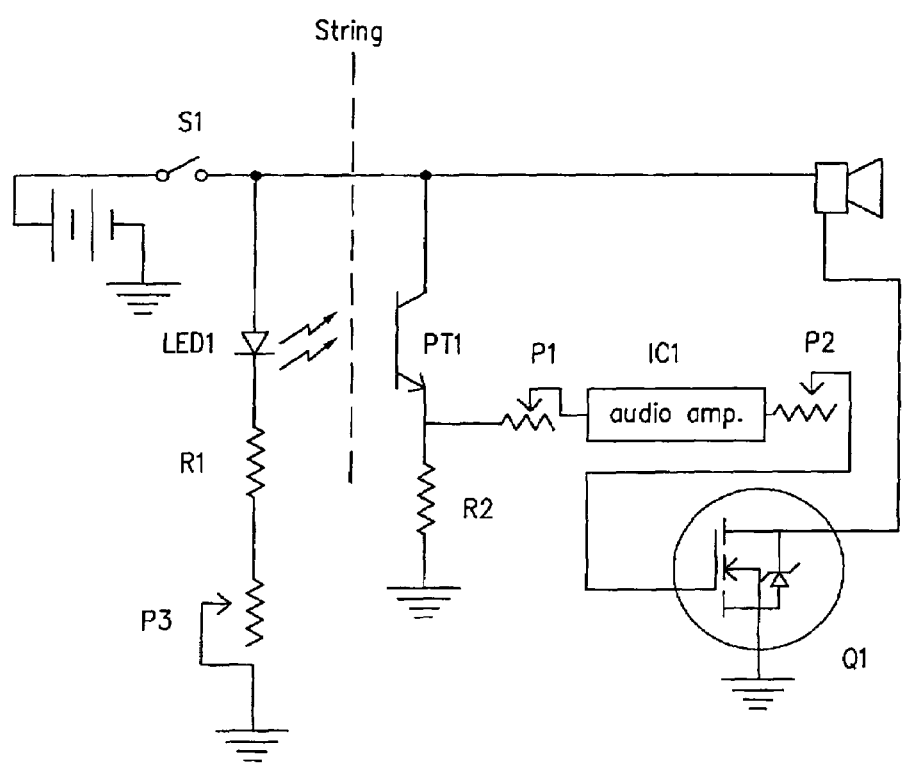
FIG. 5 is an electric schematic of the circuit of the embodiment of FIG. 3 for sensing the vibrations of the string and amplifying the electronic signals generated and feeding those signals to a dynamic speaker.

Referring to FIG. 5—once the string has been set into motion the light from the light emitting diode 1 is interfered with before it impinges on light detector 1 causing a fluctuating current in light detector 1, which causes a fluctuating voltage at the junction of the emitter of light detector 1 and resistor R2. The electronic signal thus generated is fed through potentiometer 1 to an audio amplifier and then fed through potentiometer 2 to the gate of Q1 regulating the current through the dynamic speaker in such a way as to reproduce the musical tone of the vibrating string in an amplified form. The volume is controlled by adjusting potentiometer 3, which also contains on/off switch S1.

DESCRIPTION OF A PREFERRED EMBODIMENT

FIG. 7 is a perspective view of a 'wireless' electric guitar with the ambient light shield 34 removed showing a conventional guitar head 24 and neck 22 attached to a soundboard 32 and enclosure 30 with a bridge 26 attached that provides for securing one end of 6 guitar strings.

FIG. 8 is a view along lines 8—8 which shows 6 guitar strings tensioned between 6 pairs of optoelectric pickups comprised of light emitting diodes and light detectors. The light emitting diodes and light-detectors are soldered to printed circuit boards and bent at 90° angle. They can be adjusted by further bending of the leads to cause a maximum electrical signal in the light detectors output.

FIG. 9 is a view taken along line 9—9 of FIG. 8 showing a single guitar string 42 in relation to light emitting diode 38 and a light detector 36.

Referring to FIG. 10 there is a battery with an on/off switch S1 which when in the on position provides power for the circuitry. The light emitting diodes are connected in parallel with each other and bussed to a common current limiting resistor R1 to ground.

The light detectors are connected in parallel and bussed through R2 to ground. The output voltage from the junction of the light detectors emitters and R2 is fed into the input of an FM transmitter where the signal is amplified and broadcast through space by a 7 inch piece of wire that acts as an antenna. The transmitter has an effective range of 50–75 ft. With the values shown it can be tuned to a frequency of around 100 MHz. The musical tones of any and all strings being played can be reproduced by any FM radio.

I claim:

1. An electronic assembly that makes possible the production of wireless electric stringed musical instruments that do not need a connecting cord or amplifier but senses said instruments' vibrations and broadcasts them by means of radio waves to any near by radio receiver where they are reproduced at an amplified level said assembly comprising:
  A. a removeable battery, mounted inside the assembly, and connected by means of a switch to provide power to said electronic assembly
  B. an opto-electric sub-assembly comprising a light source 38 and a light detecting element 36 for each of the strings of said musical instrument mounted on either side of said string in such a way that the light from said light source impinging on said detector is interfered with when said string vibrates causing a fluctuating current in said detector that in conjunction with current resistor r2 where the emitter of said detector is connected causes a fluctuating voltage that is analogous to said strings vibrations
  C. a cover for said sub-assembly that shields it from ambient light
  D. a radio transmitter that processes said fluctuating voltage and broadcasts said musical instruments' vibrations to any near by radio receiver.

* * * * *